Figures 1, 2:
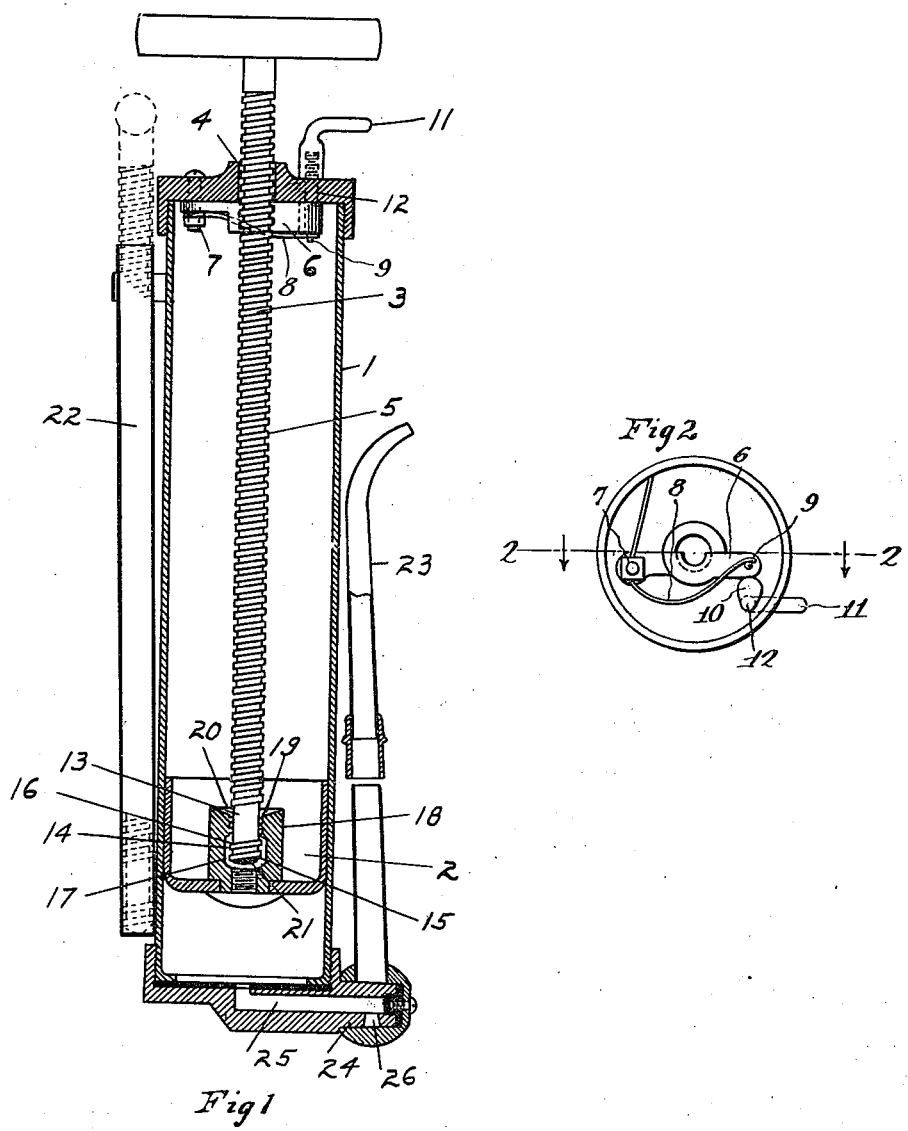

C. A. WILSON.
GREASE GUN.
APPLICATION FILED JUNE 24, 1910.

988,422.

Patented Apr. 4, 1911.

Witnesses
J. Raeph Warnken
Joseph B Beam

Clarence A. Wilson
INVENTOR
BY Stewart & Stewart
ATTORNEYS

UNITED STATES PATENT OFFICE.

CLARENCE A. WILSON, OF PASSAIC, NEW JERSEY.

GREASE-GUN.

988,422.  Specification of Letters Patent.  Patented Apr. 4, 1911.

Application filed June 24, 1910. Serial No. 568,613.

*To all whom it may concern:*

Be it known that I, CLARENCE A. WILSON, citizen of the United States of America, residing at Passaic, New Jersey, have invented certain new and useful Improvements in Grease-Guns, of which the following is a specification.

This invention relates to hand oilers, and has as an object the provision of a device particularly adapted to feeding thick, pasty materials, as heavy lubricating grease.

In order to overcome the resistance incident to the feeding of such material, I provide a screw for controlling the piston, and to move the piston more quickly when the resistance is less, there is means for throwing the screw thread out of engagement so that direct pressure may be applied to the piston rod, and it may be moved freely back and forth in its bearing. Such means for connecting and disconnecting the screw is a feature of my invention.

When the cylinder is full of grease, the piston rod, if in place, would extend for the greater portion of its length beyond the cylinder head, so for convenience I make it removable. As the piston is screw controlled, and it is desirable to rotate the rod to operate the screw, the rod should have a swivel connection with the piston, and such swivel connection, and means whereby the rod is conveniently attached to and detached from the piston without opening the cylinder to obtain access to the piston, is another feature of my invention.

In the preferred form of my grease gun, there is a cylinder and piston and a piston rod. The latter is screw threaded and has a sliding bearing in the cylinder head. There is also a member toothed or threaded to engage the thread on the piston rod, and movably mounted on the cylinder, and means for moving this member back and forth so that its thread is thrown into and out of engagement with the thread on the rod. The piston rod has a swivel engagement with the piston, and in order that the rod may be easily removed, the mouth of the swivel socket is threaded, and the end of the rod, which is enlarged to engage the socket, is also threaded to coöperate with the thread in the socket mouth, so that the enlarged end of the rod may be inserted in the socket by bringing its thread into engagement with that of the socket mouth and rotating the rod till its enlarged end moves through the socket mouth and into the chamber of the socket wherein it rotates freely. The rod may be removed by pulling it up till the threads engage and rotating it in the direction opposite to that in which it was rotated when inserted. It will be apparent that it is immaterial which member of the swivel is attached to the piston and which to the rod.

For the purposes of illustration, a grease gun embodying the features of my invention in one form is shown in the accompanying drawings.

Figure 1 is a vertical central cross section through the pump cylinder taken on the plane of the line 2—2, Fig. 2. Fig. 2 is a view of the cylinder head detached, seen from below.

The pump consists of a cylinder 1, piston 2, and piston rod 3. The latter has a sliding bearing at 4 in the cylinder head, and has a thread 5 extending throughout the greater portion of its length. A block or lever 6, threaded to coöperate with the thread 5, is pivoted at 7 to the cylinder head, and a spring 8, shown as coiled about the pivot 7 and bearing at one end against the cylinder wall, engages at its other extremity a pin 9 on the lever or block 6, tending to swing the lever away from the piston rod. Adjacent the lever or block 6, which is hereafter known as a threaded member, is an eccentric or cam 10, mounted on a pivot 12, which passes through the cylinder head, is journaled therein and provided on its other extremity outside the cylinder with a handle 11. By means of the handle 11 the eccentric 10 may be rotated, to force the threaded member 6, contrary to the tension of the spring, against the piston rod 3, bringing the threads of the former into engagement with the threads of the latter.

It will be apparent that normally the rod 3 is free to slide in its bearing 4 in the cylinder head, the spring 8 serving to maintain the threads of the member 6 out of engagement with those of the rod, so that the piston may be moved back and forth to bring it into engagement with the material to be forced out or for any other purpose, and that when great pressure is desired for ejecting heavy grease, the handle 11 may be rotated, bringing the threads of the member 6 into engagement with the threads of the piston rod, and in effect converting the bearing in the cylinder head from a sliding to a screw engagement. Adjacent its end the diameter of the piston rod is reduced, forming a shank 13 and a head or end 15. As shown, the reduced portion is of a diameter slightly less than that of the rod at the base of the threads 5. The head is provided with two turns of a thread 14, which may be of any suitable pitch and diameter, and need not be the same as the thread 5. The enlarged extremity 15 of the piston rod which carries the thread 14 is in effect the ball or disk of a swivel joint 16, the socket member of which is carried by the piston. The socket 17, as shown, is formed in a block 18, secured to the piston proper, and has a mouth or contracted opening 19 of less diameter than the socket proper 17, also less than the diameter of the head 15 and slightly greater than that of the shank. The mouth 19 is threaded to coöperate with the threads 14 so that the head 15 may be passed through the contracted mouth 19 by rotation of the rod. The top face of the block 18 is cupped at 20, and the end of the piston rod is rounded at 21, these two features coöperating to center the rod as it is inserted.

It will thus be apparent that we have a swivel joint connecting the piston and piston rod, and that the rod and piston may be connected and disconnected at this point without opening the cylinder or in any way securing direct access to the piston, and the joint is of such nature that the piston may be advanced either by screw or direct pressure of the rod, and may be retracted by direct tension on the rod. One side of the cylinder his a sheath 22, in which the piston rod may be placed when not in use, and the grease gun is provided with a swinging nozzle 23 pivoted on a hollow journal 24, which serves as a delivery passage. The passage 25 leads to a port 26, with which the nozzle 23 registers when in its lower position. When no grease is being delivered and the grease gun is out of action, the nozzle is swung about its pivot and rests against the cylinder, so that the whole device normally occupies a very small space even when the cylinder is full, making a convenient grease pump and receptacle for motor cars, etc.

I have thus described specifically a single embodiment of my invention in order that its operation may be well understood. However, the specific terms herein are used in their descriptive and not in their limiting sense.

The scope of my invention is defined in the claims.

I claim—

1. In a grease gun, a cylinder, a piston, and a piston rod, the rod having a threaded end and a shank of less diameter than the end, the piston having a socket to receive the threaded end, the socket proper being of diameter greater than the diameter of the threaded end, the mouth of the socket being contracted to a diameter less than that of the threaded end and threaded to engage it so the end of the rod may be passed through the contracted mouth by coöperation of the threads and seated in the socket.

2. In a grease gun, a cylinder, a piston, and a piston rod, the rod having a threaded portion near its extremity and a portion of less diameter than the threaded portion adjacent the latter but nearer the center of the rod, the piston having a socket concentric with the cylinder axis, the socket being of greater diameter than the outside of the thread, and having an opening to admit the end of the piston rod, the mouth of the socket being contracted to a diameter less than that of the socket proper and threaded to coöperate with the threads on the end of the piston rod.

3. In a grease gun, a cylinder, a piston, a threaded piston rod, a threaded member movably mounted on the cylinder, and means for moving it to cause its threads to engage and disengage the threads on the piston rod, the latter having a threaded extremity and a portion of less diameter than the threaded extremity adjacent the latter and nearer the middle of the rod, the piston having a socket the mouth of which is contracted and threaded, the threads of the socket corresponding to the threads on the end of the piston rod.

4. In combination a cylinder having a head; a screw-threaded piston rod the screw-thread being omitted from a portion of the rod a short distance from the end, the cylinder head being apertured for the free passage of the rod; a member secured to the cylinder and screw-threaded to coöperate with the thread of the rod; means for moving said member to cause its threads to engage and disengage those of the rod, a piston having a central socket and a throat, the throat being screw-threaded to receive the screw-threaded end of the piston rod, and the central socket being of greater diameter than the screw-thread at the end of the rod.

Signed at New York, county of New York this 23d day of June 1910.

CLARENCE A. WILSON.

Witnesses:
EVAN L. TAMBLYN,
CHARLES D. EDWARDS.